United States Patent
Nubbe

(10) Patent No.: US 9,755,284 B2
(45) Date of Patent: Sep. 5, 2017

(54) BATTERY PACK WITH EMBEDDED HEATERS

(71) Applicant: X Development LLC, Mountain View, CA (US)

(72) Inventor: Matthew A. Nubbe, Moriarty, NM (US)

(73) Assignee: X Development LLC, Mountain View, CA (US)

( * ) Notice: Subject to any disclaimer, the term of this patent is extended or adjusted under 35 U.S.C. 154(b) by 400 days.

(21) Appl. No.: 14/481,638

(22) Filed: Sep. 9, 2014

(65) Prior Publication Data

US 2016/0072161 A1 Mar. 10, 2016

(51) Int. Cl.

| | |
|---|---|
| *H01M 10/6555* | (2014.01) |
| *H01M 10/63* | (2014.01) |
| *H01M 2/10* | (2006.01) |
| *H01M 10/625* | (2014.01) |
| *H01M 10/615* | (2014.01) |
| *H01M 10/6571* | (2014.01) |
| *H01M 10/643* | (2014.01) |
| *H01M 10/052* | (2010.01) |

(52) U.S. Cl.
CPC ..... *H01M 10/6555* (2015.04); *H01M 2/1077* (2013.01); *H01M 10/615* (2015.04); *H01M 10/625* (2015.04); *H01M 10/63* (2015.04); *H01M 10/643* (2015.04); *H01M 10/6571* (2015.04); *H01M 10/052* (2013.01)

(58) Field of Classification Search
CPC . H01M 10/6555; H01M 10/63; H01M 10/643
USPC .......................................................... 429/62
See application file for complete search history.

(56) References Cited

U.S. PATENT DOCUMENTS

| | | | |
|---|---|---|---|
| 8,497,035 | B2 | 7/2013 | Herrmann et al. |
| 8,574,738 | B2 | 11/2013 | Fattig |
| 2007/0259261 | A1 | 11/2007 | Rejman et al. |
| 2008/0131764 | A1 | 6/2008 | Saiki |
| 2008/0213652 | A1 | 9/2008 | Scheucher |

(Continued)

FOREIGN PATENT DOCUMENTS

WO  WO 2012/153230 A1  11/2012

OTHER PUBLICATIONS

PCT/US2015/044507—International Search Report and Written Opinion, issued Oct. 12, 2015, 12 pages.

(Continued)

*Primary Examiner* — Basia Ridley
*Assistant Examiner* — James Erwin
(74) *Attorney, Agent, or Firm* — Christensen O'Connor Johnson Kindness PLLC

(57) ABSTRACT

A heat battery pack system includes a battery pack including a plurality of battery cells electrically interconnected to each other, a binding coupled to mechanically hold the battery cells physically together, and a heater system coupled to the battery pack to heat the battery cells. The heater system includes a heating element interweaved between the battery cells of the battery pack and a heating controller electrically coupled to the heating element to drive current through the heating element and provide heat to the battery cells of the battery pack. The weaving of the heating element between the battery cells provides fixed mechanical support to the heating element.

20 Claims, 4 Drawing Sheets

(56) References Cited

U.S. PATENT DOCUMENTS

| | | | |
|---|---|---|---|
| 2012/0003522 A1* | 1/2012 | Fuhr | H01M 2/1077 |
| | | | 429/120 |
| 2012/0225331 A1* | 9/2012 | Tartaglia | H01M 2/0267 |
| | | | 429/50 |
| 2013/0088191 A1 | 4/2013 | Sutarwala et al. | |
| 2013/0108896 A1 | 5/2013 | Daniel et al. | |
| 2013/0252040 A1 | 9/2013 | Kwak et al. | |

OTHER PUBLICATIONS

PCT/US2015/044507—International Preliminary Report on Patentability, issued Mar. 23, 2017, 10 pages.

* cited by examiner

▓ HEATING ELEMENT WEAVED ABOVE BATTERY CELL

▒ HEATING ELEMENT WEAVED BELOW BATTERY CELL

BATTERY PACK WITH EMBEDDED HEATERS

TECHNICAL FIELD

This disclosure relates generally to heating battery packs.

BACKGROUND INFORMATION

Cold temperatures have negative effects on battery packs. For example, lithium ion battery packs generally lose substantial discharge capacity at sub-freezing temperatures and are even susceptible to irreversible damage if charged in sub-freezing temperatures. In order to maintain optimal performance in sub-freezing environments, heating modules may be provided with a battery pack to maintain minimum operating temperatures. However, these heating modules can add significant mass to the assembled battery pack and often have high watt densities that form localized hot spots.

Heaters meant for batteries are fairly uncommon and tend to be supplied as an afterthought to be installed as an independent solution. One conventional heater solution includes metallized foil heaters formed from a thin metal film sandwiched in kapton film or silicone. Metallized foil heaters are useful at higher watt densities, but have excess weight, mostly in the insulation. Another conventional solution includes bare Nichrome wires integrated into a bulky enclosure to protect the ultra-high temperature wires and maintain safe operating distances. Another conventional solution includes cartridge heaters or point source heaters integrated into a thermally conductive block. These heaters have high mass and high watt densities. Finally, resistors including through hole resistors and surface mount chip resistors can serve as heaters. However, these solutions tend to have irregular shapes and/or mounting issues making uniform heating difficult.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method for operation of a battery pack heater are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
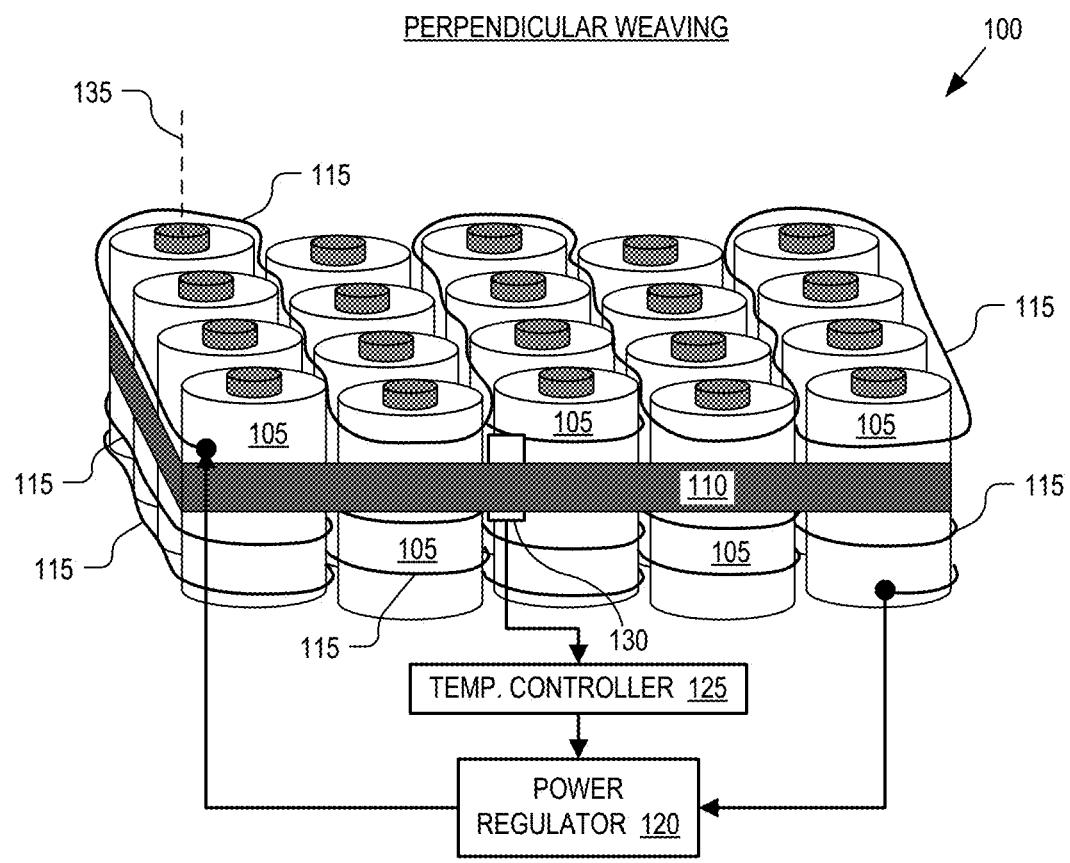
FIGS. 1A & 1B are perspective illustrations of a battery pack with a heating element weaved using a perpendicular weave pattern between the battery cells, in accordance with an embodiment of the disclosure.
Figure 1B:
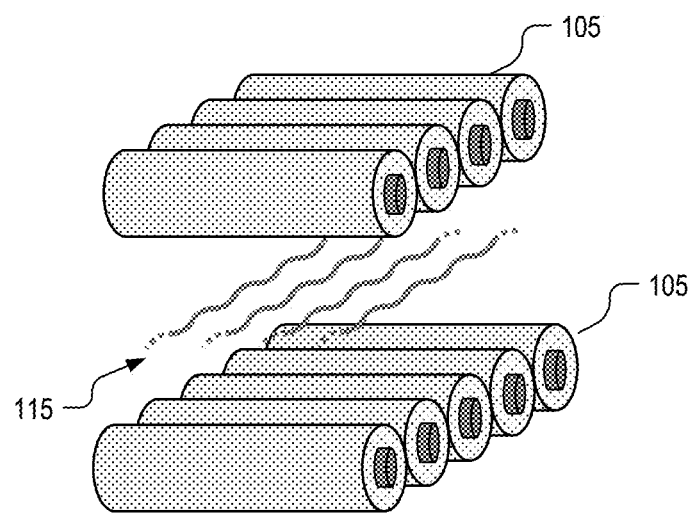

FIGS. 1A & 1B are perspective illustrations of a battery pack with a heating element interweaved between battery cells using a perpendicular weave pattern, in accordance with an embodiment of the disclosure. The illustrated embodiment includes a battery pack 100 including individual battery cells 105 bound together via a binder 110 and a battery heating system. The illustrated battery heating system includes one or more heating elements 115, a power regulator 120, a temperature controller 125, and a temperature sensor 130.

Battery cells 105 may represent a variety of different battery technologies including lithium ion batteries, nickel metal hydrate batteries, nickel cadmium batteries, or other battery technologies that lose efficiency or are damaged when operated at cold temperatures. The illustrated embodiment of battery pack 100 includes twenty interconnected cylindrically shaped battery cells 105; however, it should be appreciated that battery pack 100 may include more or less interconnected battery cells 105 having different physical shapes and bound into different shaped packages than the single layer rectangular package illustrated in FIG. 1A.

In one embodiment, heating element 115 is implemented as a resistive element that is embedded between and/or around battery cells 105 to provide distributed heat throughout battery pack 110. Heating element 115 may be implemented as a single long strand that is weaved throughout battery pack 100 and coupled at either end to power regulator 120. Alternatively, heating element 115 may be implemented as a number of parallel or series coupled resistive elements.

FIGS. 1A and 1B illustrate a perpendicular weave pattern embodiment where heating element 115 is weaved along a path that runs substantially perpendicular to a primary axis 135 (e.g., axis of symmetry running through a radial center) of the cylindrically shaped battery cells 105. In the illustrated embodiment, heating element 115 weaves back and forth between the battery cells 105, following a corrugated or undulating path through interior portions of battery pack 100, and around the outer perimeter edges of battery pack 100. In one embodiment, the heating element 115 traverses several repeating loops or courses through battery pack 100 with each loop offset vertically to evenly heat the volume occupied by battery cells 105.

The interweaving of heating element 115 between and around battery cells 105 also serves to provide the mechanical support to hold heating element 115 in place. In other words, in some embodiments, heating element 115 does not have an independent support structure other than the battery cells themselves. Battery cells 105 are physically secured together by binder 110. Binder 110 may be implemented using shrink wrap, a strap, a band, or other binding material. Thus, binder 110 provides mechanical support to rigidly hold battery cells 105 while the weave of heating element 115 around battery cells 105 provides the mechanical support to hold heating element 115 in place.

Figure 2A:
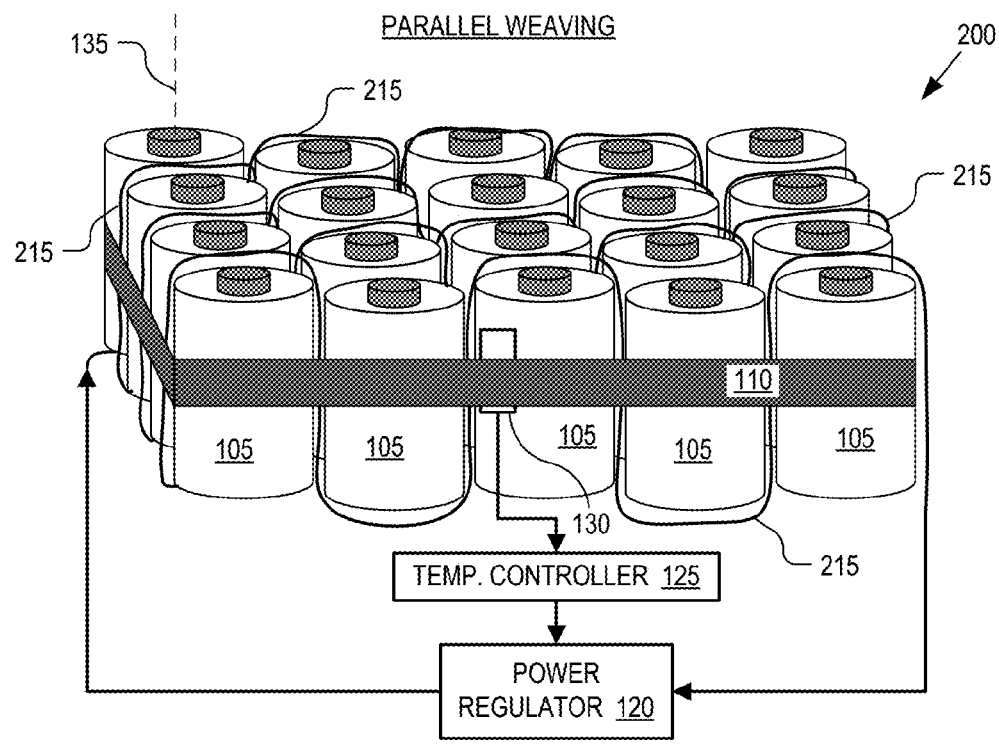
FIGS. 2A & 2B are perspective illustrations of a battery pack with a heating element weaved using a parallel weave pattern between the battery cells, in accordance with an embodiment of the disclosure.
Figure 2B:
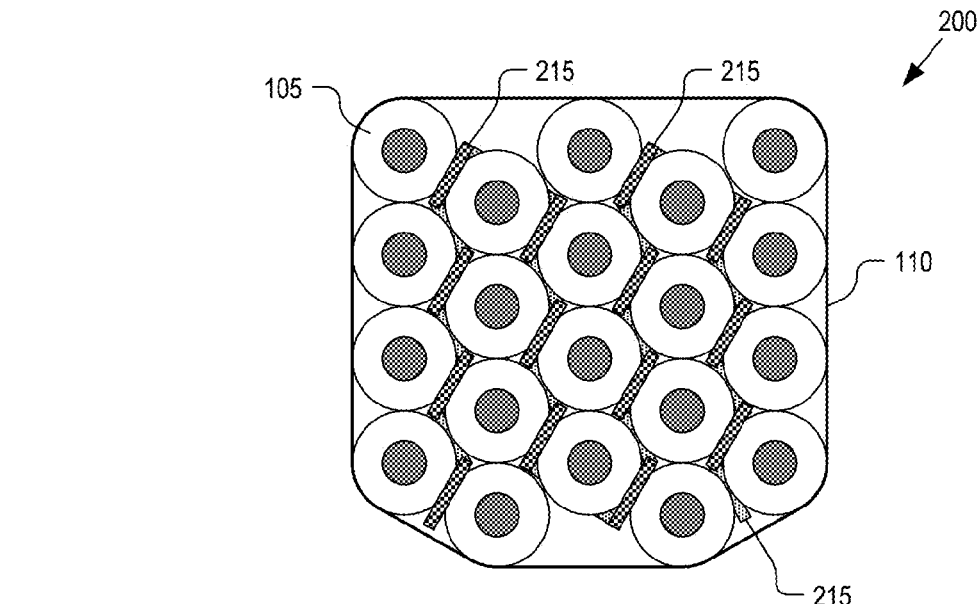

Although FIGS. 1A and 1B illustrate a perpendicular weave pattern, heating element 115 may be interwoven throughout battery pack 100 amongst battery cells 105 using a variety of weave patterns to achieve distributed heat. In some embodiments, the weave pattern achieves a substantially uniform coverage to provide uniform heating. However, in other embodiments, it may be desirable to use a non-uniform weave pattern to concentrate heating to certain localities, such as additional winding around the outer perimeters (e.g., sides, top, bottom), if a given side is exposed to lower temperatures. FIGS. 2A & 2B illustrate of a battery pack 200 with a heating element 215 weaved according to a parallel weave pattern. As illustrated, heating element 215 is weaved around each battery cell 105 such that it runs substantially parallel to primary axis 135 along the sides of each battery cell 105 and loops over the top or under the bottom between adjacent battery cells 105. Of course, other weave patterns and distributions may be implemented using one long continues heating element 215 or several heating elements 215 connected in series or parallel with power regulator 120.

In one embodiment, heating element 115 (or 215) is a resistive wire coated with an electrical insulator to reduce the possibility of electrical shorts with battery cells 105. The gauge of the resistive wire may be selected according to allowable wattage per length, desired wattage, operating voltage/current need to achieve the desired amount of heating, and/or wire length. The wire may have a circular cross-section, elongated cross-section, flat/rectangular cross-section (e.g., foil strip), or otherwise. Heating element 115 is operated using low operational temperatures relative to typical heating filaments. This low watt density operation is sufficient to heat battery pack 100, since the heating element 115 is weaved around and throughout batter pack 100 to provide a distributed even heating solution. This is in contrast to localized or point source heaters that use high watt density heating elements that operate at high temperatures. This low watt density solution permits heating element 115 to be coated with an electrical insulator, such as plastic, that does not melt at operational temperatures of the heating element. For example, the coating may be a heat resistant insulation such as ethylene tetrafluoroethylene (ETFE), polytetrafluoroethylene (PTFE), perfluoroalkoxy alkanes (PFA), polyimide, or otherwise.

The heating system of battery pack 100 includes cooperative operation between temperature sensor 130, temperature controller 125, power regulator 120, and heating element 115. In one embodiment, power regulator 120 along with temperature controller 125 and temperature sensor 130 provide feedback control to maintain a temperature of battery pack 100 within a defined operating temperature when battery pack 100 is operated in a cold ambient environment. The absence of an independent mechanical housing or enclosure for heating element 115 provides a lightweight, low power heating solution that is well-suited for weight sensitive applications such as aerial vehicles, though this heating solution is also suitable for other applications including terrestrial vehicles, water vehicles, or otherwise. Furthermore, the omission of an independent enclosure of heating element 115 reduces costs. The distributed low power operational regime of heating element 115 improves the heating uniformity while also improving reliability since delicate, high temperature heating filaments are avoided.

Figure 3:
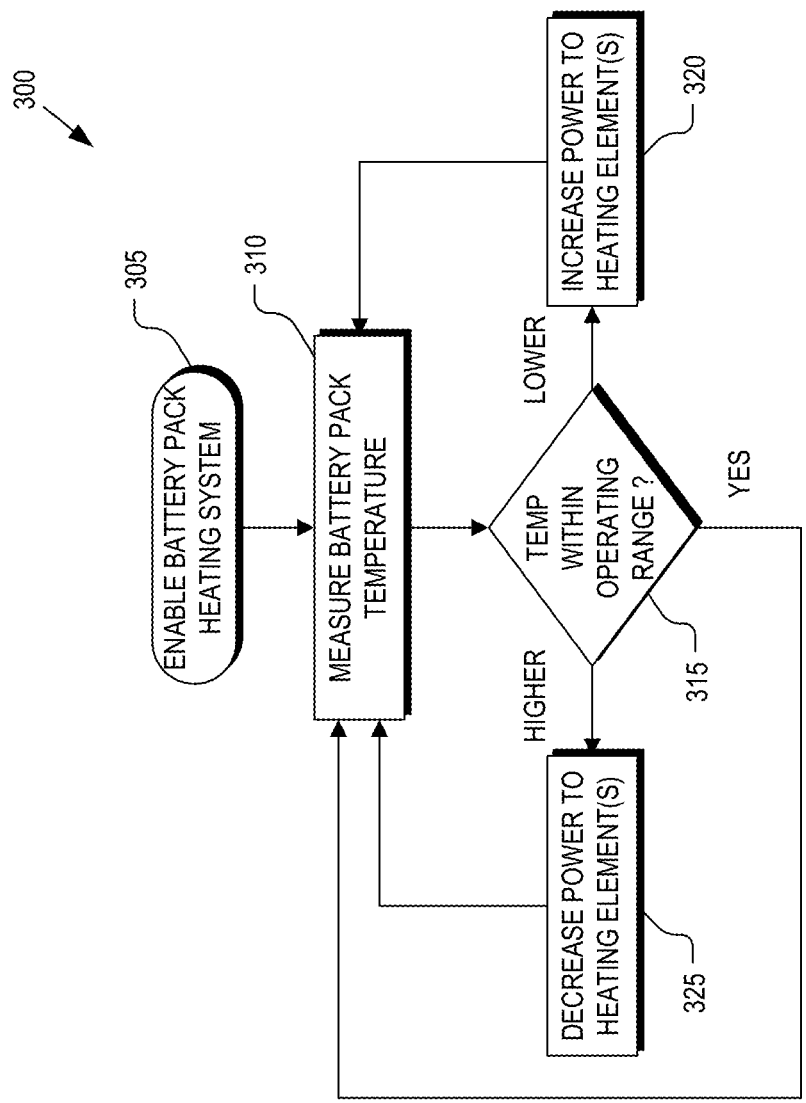
FIG. 3 is a flow chart illustrating a process for maintaining a temperature of a battery pack within an operating range, in accordance with an embodiment of the disclosure.

FIG. 3 is a flow chart illustrating a process 300 for maintaining a temperature of battery pack 100 within an operating range, in accordance with an embodiment of the disclosure. Process 300 is described with reference to battery pack 100, but is equally applicable to battery pack 200. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, the heating system for battery pack 100 is enabled. The heating system may be enabled in response to a control signal input into temperature controller 125 or based upon a low temperature reading output from temperature sensor 130. In one embodiment, temperature controller 125 is implemented with a microcontroller that includes operational logic implemented in software/firmware, hardware, or a combination of both. In one embodiment, temperature controller 125 is an analog control circuit. In one embodiment, temperature sensor 130 is implemented using one or more thermistors embedded within battery pack 100. Other temperature sensor technologies (e.g., thermocouple, quartz thermometer, resistance temperature detector (RTD), silicon bandgap temperature sensor, infrared thermometer, etc.) may be used as well.

In a process block 310, temperature controller 125 acquires a temperature reading based upon a sensor signal output from temperature sensor 130. If the reading falls below a specified operating range (decision block 315), then temperature controller 125 outputs a control signal to power regulator 120 to increase the power delivered to heating element 115 (process block 320). If the reading is above the specified operating range (decision block 315), then temperature controller 125 outputs a control signal to power regulator 120 to decrease the power delivered to heating element 115 (process block 325). If the reading is within the specified operating range (decision block 315), then temperature controller 125 instructs power regulator 120 to maintain a constant power output. While FIG. 3 illustrates power control logic with a hysteresis loop, other simpler control algorithms (e.g., single ON/OFF threshold) or more complex control algorithms (e.g., PID algorithms) may be implemented by temperature controller 125.

In one embodiment, power regulator 120 is a voltage controlled current source that controls the current through heating element 115 in response to a voltage control signal output from temperature controller 125. In other embodiments, power regulator 120 may be implemented as an adjustable voltage source or otherwise. Power regulator 120 may control the power delivery into heating element 115 via increasing/decreasing the magnitude of an applied current or voltage, modulating a duty cycle of a fixed current/voltage source (e.g., pulse width modulation), or otherwise.

Figure 4:
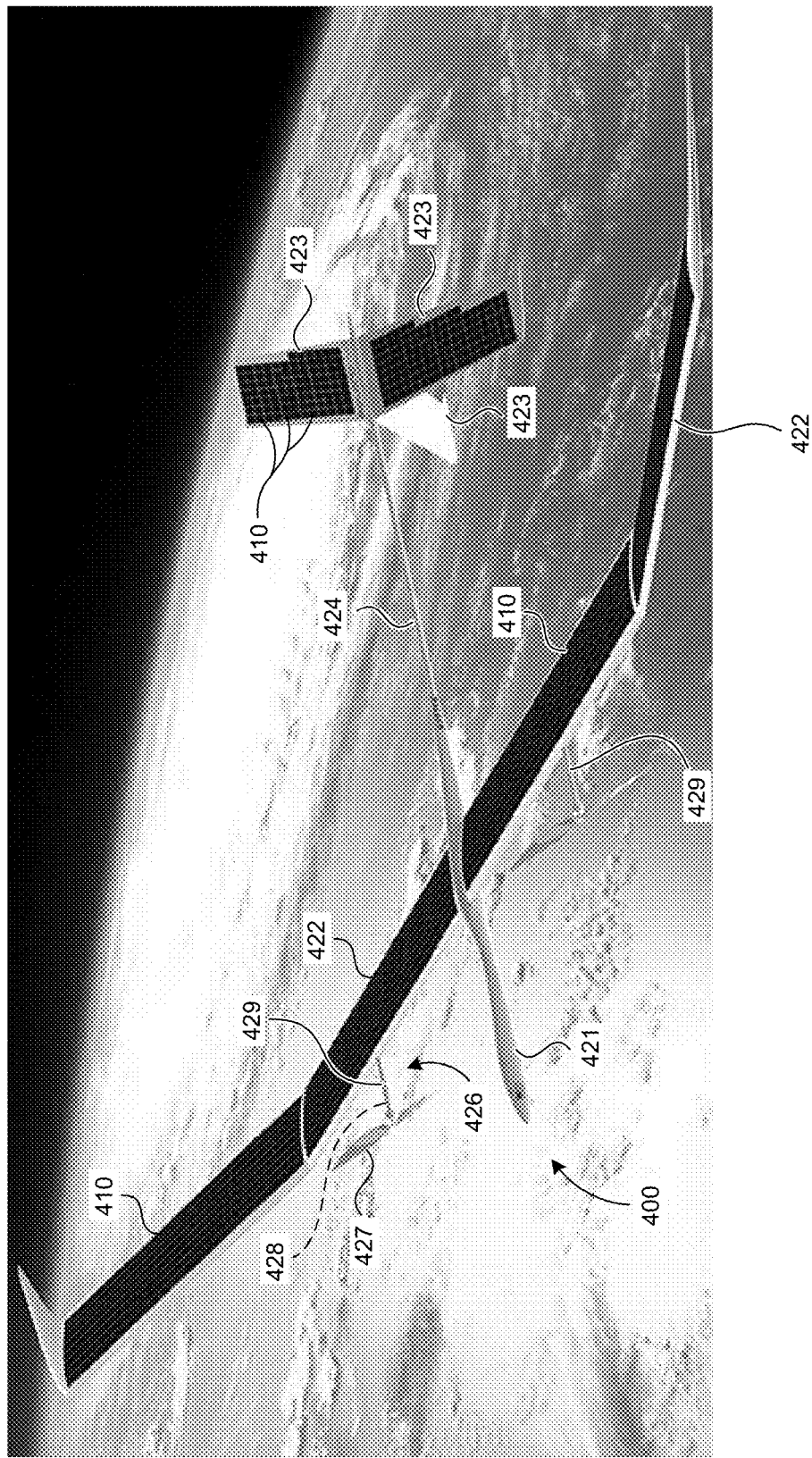
FIG. 4 illustrates an aerial vehicle that includes subsystems powered by a battery pack that is heated, in accordance with an embodiment of the disclosure.

FIG. 4 illustrates an example vehicle that includes subsystems powered by a battery pack, such as battery pack 100 or 200, which is heated using embodiments of the techniques described above. The low power density, light weight solution of the heating systems described above is well suited for aerial vehicles, such as an unmanned air vehicle (UAV).

In the illustrated embodiment, an aerial vehicle 400 includes a narrow, elongated fuselage 421 coupled to one or more wings 422 or other lifting surfaces. The aerial vehicle 400 can further include a stabilizer boom or empennage 424 carrying one or more stabilizers 423 that provide stability and control functions. The aerial vehicle 400 can still further include a propulsion system 426, which can in turn include one or more nacelles 429, each of which houses an electric motor 428 that powers a corresponding propeller 427.

UAVs have proliferated recently because they can perform a variety of valuable tasks without incurring the costs and risks associated with a piloted aircraft. Typical UAV tasks include public safety and communication tasks. However, one drawback with many existing UAVs is that they have limited endurance and can accordingly remain on-station for only a limited period of time. As a result, it can be difficult to provide the foregoing tasks consistently for an extended period of time.

One approach to addressing the foregoing endurance issues is to provide solar power to a UAV, potentially enabling the UAV to remain on-station for extended periods of time because it generates the power it requires while in flight. Aerial vehicle 400 includes one or more battery packs to power on-board electrical sub-systems (e.g., propulsion systems 426, actuators for adjusting flight surfaces, communication systems, navigation system, control systems, etc.). Solar cells 410 are coupled to the battery packs to provide continuous charging when solar energy is incident upon their surfaces.

Aerial vehicle 400 can be particularly configured to fly at very high altitudes (e.g., 65,000 ft) under the power produced by its solar cells 410. At very high altitudes, extreme cold conditions exist, which can detrimentally impact the performance of the battery packs. As such, the heating systems described above serve to efficiently maintain desired operational temperatures in a durable and lightweight form factor.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   a battery pack including a plurality of battery cells electrically interconnected to each other;
   a binding coupled to mechanically hold the battery cells physically together; and
   a heater system coupled to the battery pack to heat the battery cells, the heater system including:
      a heating element interweaved between the battery cells of the battery pack, wherein the weaving of the heating element between the battery cells provides mechanical support to the heating element, wherein the heating element is wrapped multiple times around one or more of the battery cells; and
      a heating controller electrically coupled to the heating element to drive current through the heating element and provide heat to the battery cells of the battery pack, wherein the heating element comprises a resistive wire that heats in response to the current from the heating controller.

2. The apparatus of claim 1, wherein the resistive wire is coated with an electrical insulator.

3. The apparatus of claim 2, wherein the electrical insulator comprises a plastic that does not melt at operational temperatures of the heating element.

4. The apparatus of claim 1, further comprising a plurality of heating elements interweaved between the battery cells of the battery pack, the plurality of heating elements each coupled to the heating controller to provide distributed heat throughout the battery pack.

5. The apparatus of claim 1, wherein the heating element is weaved adjacent to each of the battery cells to provide heat to each of the battery cells of the battery pack.

6. The apparatus of claim 5, wherein the heating element is weaved multiple times at least partially around or between each of the battery cells to provide distributed heat to each of the battery cells of the battery pack.

7. The apparatus of claim 6, wherein the battery cells comprise cylindrically shaped battery cells and the heating element is weaved along a path that runs substantially perpendicular to primary axes of each of the battery cells.

8. The apparatus of claim 6, wherein the battery cells comprise cylindrically shaped battery cells and the heating element is weaved along a path that periodically runs substantially parallel to primary axes of each of the battery cells.

9. The apparatus of claim 1, wherein the battery cells comprise cylindrically shaped lithium ion battery cells.

10. The apparatus of claim 1, wherein the heating controller comprises:
    a temperature sensor embedded within the battery pack;
    a power regulator coupled to the heating element to drive power into the heating element; and
    a temperature controller coupled to receive a sensor signal from the temperature sensor and to generate a control signal responsive to the sensor signal, the control signal coupled to the power regular to control an amount of power delivered into the heating element based at least in part on the sensor signal.

11. The apparatus of claim 1, wherein the heating element does not have an independent mechanical support from the battery cells or the binding to hold the heating element in an interweaved pattern between the battery cells.

12. The apparatus of claim 11, wherein the binding comprises shrink wrap.

13. A heated battery pack system, comprising:
a battery pack including a plurality of battery cells electrically interconnected to each other;
a binding coupled to mechanically hold the battery cells physically together; and
a heater system coupled to the battery pack to heat the battery cells, the heater system including:
  a heating element interweaved between the battery cells of the battery pack, wherein the weaving of the heating element between the battery cells provides fixed mechanical support to the heating element, wherein the heating element is wrapped multiple times around one or more of the battery cells; and
  a heating controller electrically coupled to the heating element to drive current through the heating element and provide heat to the battery cells of the battery pack, wherein the heating element comprises a resistive wire that heats in response to the current from the heating controller,
wherein the heating element does not have an independent mechanical support from the battery cells or the binding to hold the heating element interwoven between the battery cells.

14. The heated battery pack system of claim 13, wherein the binding comprises shrink wrap.

15. The heated battery pack system of claim 13, wherein the resistive wire is coated with an electrical insulator.

16. The heated battery pack system of claim 13, further comprising a plurality of heating elements interweaved between the battery cells of the battery pack, the plurality of heating elements each coupled to the heating controller to provide distributed heat throughout the battery pack.

17. The heated battery pack system of claim 13, wherein the heating element is weaved multiple times at least partially around or between each of the battery cells to provide distributed heat to each of the battery cells of the battery pack.

18. The heated battery pack system of claim 13, wherein the battery cells comprise cylindrically shaped battery cells and the heating element is weaved along a path that runs substantially perpendicular to primary axes of each of the battery cells.

19. The heated battery pack system of claim 13, wherein the battery cells comprise cylindrically shaped battery cells and the heating element is weaved along a path that periodically runs substantially parallel to primary axes of each of the battery cells.

20. The heated battery pack system of claim 13, wherein the heating controller comprises:
a temperature sensor embedded within the battery pack;
a power regulator coupled to the heating element to drive power into the heating element; and
a temperature controller coupled to receive a sensor signal from the temperature sensor and to generate a control signal responsive to the sensor signal, the control signal coupled to the power regular to control an amount of power delivered into the heating element based at least in part on the sensor signal.

* * * * *